US007831079B2

(12) United States Patent
Kunz et al.

(10) Patent No.: US 7,831,079 B2
(45) Date of Patent: Nov. 9, 2010

(54) SEGMENTATION OF ANATOMIC STRUCTURES USING NAVIGATION TABLE

(75) Inventors: Patrik Kunz, Baden (CH); Martin Scholz, Berlin (DE); Benjamin Haas, Bern (CH); Thomas Coradi, Ennetbaden (CH)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 12/550,274

(22) Filed: Aug. 28, 2009

(65) Prior Publication Data

US 2009/0316975 A1 Dec. 24, 2009

Related U.S. Application Data

(62) Division of application No. 11/494,860, filed on Jul. 28, 2006, now Pat. No. 7,599,539.

(51) Int. Cl.
*G06K 9/00* (2006.01)
(52) U.S. Cl. ........................................ 382/128; 382/173
(58) Field of Classification Search ................ 382/128, 382/131, 132, 173, 282; 128/922
See application file for complete search history.

(56) References Cited

U.S. PATENT DOCUMENTS

| 6,396,939 B1 | 5/2002 | Hu et al. ..................... 382/128 |
| 6,674,883 B1 | 1/2004 | Wei et al. .................... 382/132 |
| 6,754,376 B1 | 6/2004 | Turek et al. .................. 382/131 |
| 7,004,904 B2 | 2/2006 | Chalana et al. ............. 600/443 |
| 2002/0009215 A1 | 1/2002 | Armato, III et al. ......... 382/131 |
| 2005/0094858 A1 | 5/2005 | Sirohey et al. .............. 382/131 |

OTHER PUBLICATIONS

Archip et al., "A Knowledge-Based Approach to Automatic Detection of the Spinal Cord in CT Images," IEEE Transactions on Medical Imaging, Dec. 2002, vol. 21, No. 12, pp. 1504-1516.
Betke et al., "Landmark Detection in the Chest and Registration of Lung Surfaces with an Application to Nodule Registration," Medical Imaging Analysis, Sep. 2003, vol. 7, No. 3, pp. 265-281.
Qatarneh et al., "Evaluation of a Segmentation Procedure to Delineate Organs for Use in Construction of a Radiation Therapy Planning Atlas," International Journal of Medical Infomatics, Sep. 2003, vol. 69, pp. 39-55.
Rohr et al., "Landmark-Based Elastic Matching of Tomographic Images," IEEE Transactions on Medical Imaging, Jun. 2001, vol. 20, No. 6, pp. 526-534.
Schubert et al., "Symbolic Modeling of Human Anatomy for Visualization and Simulation," Visualization in Biomedical Imaging, 1994, Proc. SPIE, 2359, pp. 412-423.
Scholz, "Automatische Generierung von strahlentherapeutischen Volumina aufgrund wissensbasierter Ansatze," Doctorate thesis, Medicine of the Humboldt University, 2001.
PCT, International Search Report (PCT/ISA/210) in PCT/US07/72415, Sep. 22, 2008, 5 pages.
PCT, Written Opinion of the International Searching Authority (PCT/ISA/237) in PCT/US07/72415, Sep. 22, 2008, 4 pages.
USPTO, Notice of Allowability (PTOL-37) in U.S. Appl. No. 11/494,860, filed Jun. 2, 2009, 2 pages.

*Primary Examiner*—Andrew W Johns
(74) *Attorney, Agent, or Firm*—Houst Consulting

(57) ABSTRACT

A method of constructing a navigation table relating a set of images representative of a region of interest in a subject to a reference system with reference positions indicating known anatomic landmarks of a reference subject comprising providing reference positions for two or more images identified with two or more anatomic landmarks indicative of the region of interest with reference positions of known anatomic landmarks corresponding to the identified anatomic landmarks, and determining reference positions for the remaining images by interpolation.

7 Claims, 6 Drawing Sheets

SEGMENTATION OF ANATOMIC STRUCTURES USING NAVIGATION TABLE

CROSS REFERENCE TO RELATED APPLICATIONS

This application is a divisional application of U.S. pat. application Ser. No. 11/494,860 filed Jul. 28, 2006 entitled ANATOMIC ORIENTATION IN MEDICAL IMAGES, the disclosure of which is incorporated herein by reference.

FIELD OF THE INVENTION

This invention relates generally to medical image processing, and in particular to anatomic orientation in medical images useful in a variety of applications including automatic segmentation, automatic classification, data mining, retrieval in medical databases, and computer assisted diagnose.

BACKGROUND

Various types of medical imaging systems or modalities are available for generating images of a patient's anatomy and function for diagnostic and treatment purposes. These include X-ray computed tomography ("CT") imaging, magnetic resonance imaging ("MRI"), positron emission tomography ("PET") and single photon emission computed tomography ("SPECT"). These imaging modalities create digital images comprised of an array of numerical values representative of a property (such as a grey scale value) associated with an anatomic location. In two-dimensional ("2-D") digital images, or slice sections, the discrete array locations are termed pixels. Three-dimensional ("3-D") digital images are constructed from stacked slice sections through various construction techniques known in the art. In 3-D digital images, the discrete volume elements are termed voxels.

Various analytical approaches can be applied to process digital images to detect, identify, display or highlight regions of interest ("ROI"). For example, digitized images can be processed through segmentation and registration. Segmentation generally involves separating irrelevant objects, or extracting anatomic surfaces, structures, or regions of interest from images for purposes of anatomic identification, diagnosis, evaluation, and volumetric measurement. Image registration is a process of finding correspondence of points in two different images for facilitating comparisons and medical diagnosis.

Conventional segmentation and registration techniques require prior anatomic or geometric knowledge about the image content in order to work reliably. The prior knowledge is either given implicitly or through user interaction. For instance, some prior techniques are limited to segment a given structure such as a certain body region or specific organ, relying on the fact that the image contains the structure to be segmented. In many segmentation techniques, prior knowledge such as guidance points are provided by a computer user through a graphical user interface or formal description.

Conventional segmentation and registration techniques requiring prior knowledge are not sufficiently robust. For example, there is significant probability of mismatch. They also take long computation time and are not satisfactory in dealing with great variability present in daily clinical diagnostic images.

SUMMARY OF THE INVENTION

A method of constructing a navigation table relating a set of images representative of a region of interest in a subject to a reference system with reference positions indicating known anatomic landmarks of a reference subject is provided. The method comprises providing reference positions for two or more images identified with two or more anatomic landmarks indicative of the region of interest in the subject with reference positions of known anatomic landmarks corresponding to the identified anatomic landmarks, and determining reference positions for the remaining images by interpolation.

In some embodiments, a method of automatic segmentation of an anatomic structure in medical images for a region of interest in a subject is provided. The method comprises receiving a set of images representative of the region of interest, constructing a navigation table relating the set of images to a reference system, the reference system including reference positions indicating known anatomic landmarks of a reference subject, selecting one or more images including the anatomic structure by looking up the navigation table, and performing a segmentation procedure for the selected images.

In some embodiments, a method of processing X-ray computed tomography (CT) images is provided. The method comprises receiving input CT images representative of a region of interest in a subject, the input CT images including segments having CT values represented by Hounsfield Unit values, transforming the Hounsfield Unit values to pixel values, and identifying an outline of the region of interest by thresholding the images to a range of pixel values.

In some embodiments, a method of processing medical images is provided. The method comprises the steps of receiving a set of images representative of a region of interest in a subject, determining the region of interest by identifying one or more first landmarks indicative of the region of interest, detecting one or more second landmarks in the determined region of interest, constructing a navigation table relating the set of images to a reference system with reference positions indicating known anatomic landmarks of a reference subject. The constructing step comprises providing reference positions for images containing identified first and/or second landmarks with positions of known anatomic landmarks in the reference system, and determining reference positions for the remaining images by interpolation. In some embodiments, the method further comprises the steps of detecting the gender of a subject patient, or a patient's orientation or supine or prone position.

BRIEF DESCRIPTION OF THE DRAWINGS

These and various other features and advantages of the present invention will become better understood upon reading of the following detailed description in conjunction with the accompanying drawings and the appended claims provided below, where:

DETAILED DESCRIPTION OF THE EMBODIMENTS OF THE INVENTION

Figure 1:
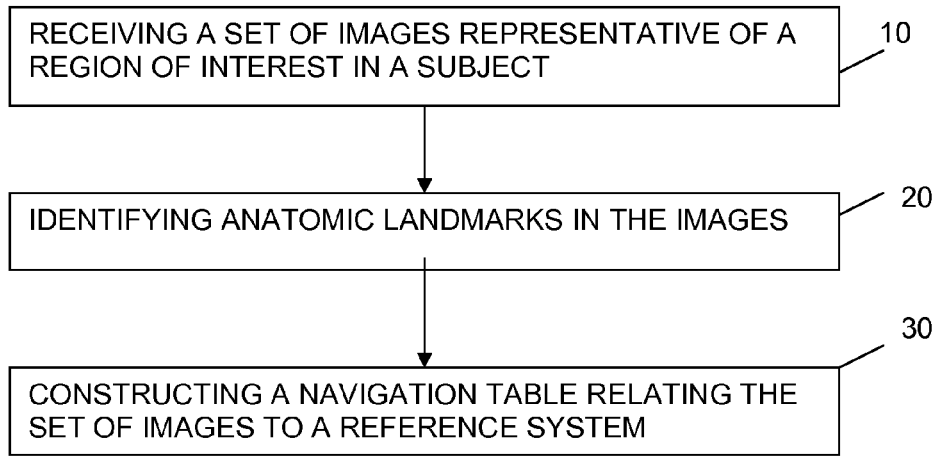
FIG. 1 is a flowchart illustrating the exemplary steps of anatomic orientation in accordance with one embodiment of the present invention.

Various embodiments of the present invention are described hereinafter with reference to the figures. It should be noted that some figures are schematic and the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in any other embodiments of the present invention. For instance, various embodiments are provided in the drawings and the following description in connection with X-ray computed tomography ("CT") imaging. It will be appreciated that the claimed invention may also be used with other imaging modalities such as magnetic resonance imaging ("MRI"), positron emission tomography ("PET"), and single photon emission computed tomography ("SPECT"). Further, various embodiments are provided where the pelvis and thorax regions of a human patient are investigated. It will be appreciated that the claimed invention can be used in examination of not only human patients and any of their body regions, but also living animals and plant of any size. Moreover, various embodiments are provided in the context of image segmentation or registration. It will be appreciated that the claimed invention can also be used in other applications such as automatic classification, data mining, retrieval in medical databases, computer assisted diagnose, and automatic verification of image content for quality and safety assurance.

As used herein, the following definitions shall apply unless otherwise indicated.

Anatomic orientation refers to a process of identifying one or more of anatomical landmarks, patient gender, patient orientation, patient position, and body regions in medical images, and may include the ways of using the identified information in automatic segmentation and other computerized medical image interpretation tasks.

Anatomic landmarks or anatomic points refer to locations in an anatomy which can be detected in medical images with some certainty, or confidence, as will be defined below. By way of example, anatomic landmarks in the pelvis region of a human patient include but are not limited to acetabulum, upper syphysis gap, trochanter major, pubic bone, or lower syphysis. Anatomic landmarks in the thorax region of a human patient include but are not limited to cervix middle, axilla middle, thorax superior, thorax middle, or trachea bifurcation.

Patient orientation refers to the relative position of a patient's body, for example with reference to the head and feet in an imaging modality. By way of example, a cranio-caudal orientation extends from the head and to the feet.

Patient position refers to the relative direction of a patient, for example a facing direction when a patient is lying on a support structure. For example, a supine position is one facing upward, and a prone position is one facing downward when a patient is lying on a support structure.

Subject refers to human, any living animal or plant of any size, or any object of interest under investigation.

Region of interest refers to a part of interest in a subject. By way of example, regions of interest include but are not limited to a body region in a human patient such as the pelvis region, thorax region, abdomen region, and so on.

Confidence refers to the relative certainty of identification of an anatomic landmark. A confidence value can be calculated and assigned to an identified anatomic landmark as will be described in more detail below.

Navigation table refers to a table which describes the relation of the images being processed to a reference system. Construction of the navigation table will be described in more detail below.

Segmentation refers to identification of specific structures on a series of images.

Registration refers to a process of finding correspondence of points in two different images, or a point in an image and a point in a model.

Thresholding in image processing refers to a process of substituting intensity values in an image above or below a certain value with a different, fixed value.

Axial image refers to an image where the image plane is perpendicular to the longitudinal axis of the body.

Sagittal image refers to an image where the image plane separates the left from the right of the body.

Coronal image refers to an image where the image plane separates the anterior from posterior.

2-dimensional (2-D) image refers to a planar image, e.g., an axial image.

3-dimensional (3-D) image refers to an image consisting of multiple 2-D images.

Segment refers to a designated region of a planar image, or a set of connected pixels where every pixel of a segment has at least one neighboring pixel that also belongs to the segment.

Medical images refers to images created by an imaging modality. By way of example, medical images include but are not limited to X-ray CT images, MRI images, PET images, ultrasound images, and SPECT images.

Slice or Image slice refers to an image plane of a tomography image.

Image coordinate system refers to a system defined in a specific way. For purpose of example, embodiments are illustrated with an image coordinate system where the axes are right handed and its Z axis is perpendicular to the image planes.

Z axis of the human body refers to the cranio-caudal axis of the human body.

FIG. 1 illustrates the exemplary steps of anatomic orientation or method of processing medical images in accordance with one embodiment of the present invention. At step 10, a set of images representative of a region of interest in a subject is received. Anatomic landmarks are identified in the images at step 20. In some embodiments, the patient's body region imaged, the patient's gender, the patient's orientation and position are detected by the identified landmarks. In some embodiments, more landmarks are detected within the detected body region. At step 30, a navigation table is constructed relating the set of images to a reference system. The reference system provides reference positions for a set of images covering the region of interest in a reference subject or the entire reference subject. By way of example, the reference subject can be the human anatomy. The reference system can be a scale along the Z-axis of the human anatomy indicating reference positions for known anatomic landmarks in the reference human anatomy. In the construction step 30, reference positions for the images containing identified landmarks are provided with the reference positions of the known anatomic landmarks of the reference subject in the reference system, whereas the reference positions for the remaining images are determined by interpolation.

The medical image can be any input image created by any imaging modality. As a preliminary step, a procedure can be performed to determine the type of the input image such as X-ray CT image. The image resolution can also be checked in the preliminary step. In one embodiment, a set of X-ray CT image each representative of approximately 1 cm per slice or section of a body region and a pixel size in the axial planes of approximately 3×3 mm or smaller are received. The input image may be received or clipped in an orderly manner.

Figure 2:
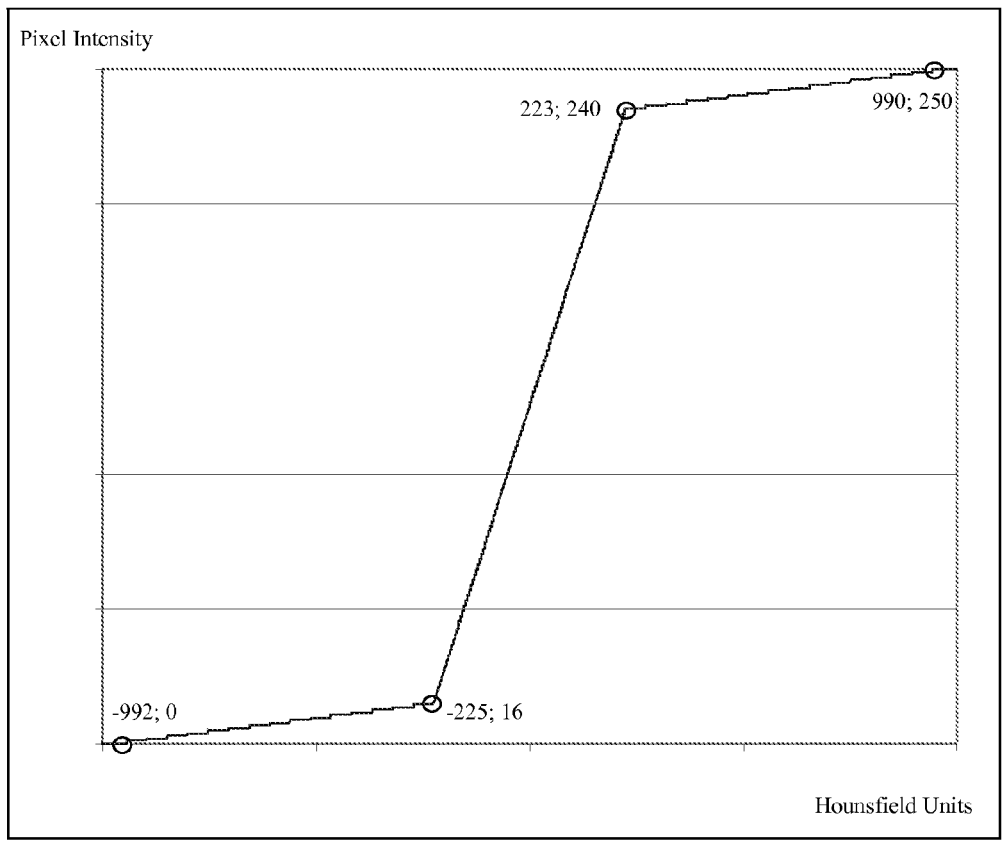
FIG. 2 is a plot transforming Hounsfield units to image intensity in accordance with one embodiment of the present invention.

Presegmentation can be performed in every slice of the input image to extract the image segments defining the outline of the patient's body, and the bone and low density segments within the body outline. As used herein, bone segments represent not only bone tissue, but also metal pieces, calcifications, and other high density objects. Low density segments represent lung tissue or air. Prior to presegmentation, the input image intensity values are transformed from the original Hounsfield units to pixel values in the interval from 0 to 255 using the lookup table shown in FIG. 2. In the following description, the pixel values refer to the transformed values.

The body segments are the set of connected components that represent parts of the human body. The body segments are detected by thresholding the image to the intensity value range from 40 to 250 and then performing a connected component labeling.

Algorithm for body tissue extraction may include the following steps:
   Thresholding input image, considering pixel values in the range from 40 to 250;
   Morphological opening with 4-neighborhood to exclude parts from the patient support structure which may be included in the image due to their proximity to the body and their intensity values in the image; and
   Connected component labeling.

Segment exclusion by area: Labeling may produce very small segments which are most likely image noise, and segments that include parts of the patient support structure such as the cushion or the couch of the imager. The area of a pixel (in mm$^2$) is determined from the pixel size property of the input image. The area of a segment is given by the number of pixels of the segment and the pixel area. Segments with an area smaller than 800 mm$^2$ can be ignored.

Segment exclusion by position: Segments are desirably overlapped with a rectangle of size 340 mm by 170 mm centered in the image slice. Because of this, only one of two legs or arms may be considered, but this does not affect the rest of the anatomic orientation algorithms.

The bone tissue or high density segments represent bones, which are one of the main interests for anatomic orientation, calcifications, wood, plastic, or metal. Same as the body segments, the bone segments can be determined in every slice of the image individually.

High density segments are determined within the body outline, i.e. overlap with one of the body segments determined before. Segments considered have a pixel intensity in the range from 200 to 250 and a minimum area of 25 mm$^2$.

The set of high density segments can be filtered to remove segments that certainly do not represent bones. Some images contain high density regions near the edges of the body outline due to image reconstruction artifacts. High density segments with a minimum distance<7 mm and a mean distance<15 mm from the respective body segment's outline can be ignored.

Low density segments represent lung tissue and large air cavities within the body outline. Segments considered have a pixel intensity in the range from 0 to 30 and a minimum area of 200 mm$^2$.

Returning to FIG. 1, anatomic landmarks are identified. Since anatomic landmarks are known locations which can be detected with some confidence, the selection of anatomic landmarks depend on the region of interest. For example, in the pelvis region, the anatomic landmarks may include crista iliaca superior, os pubis, acetabulum, trochanter major, and symphysis points. In the thorax region the anatomic landmarks may include cervix middle, axilla middle, thorax superior, thorax middle, and trachea bifurcation.

Crista iliaca marks the cranial (upper) end of the pelvis bone. When viewing the total width of the bone tissue along the Z axis of axial image, this landmark is defined by a sharp transition given by the relatively small width of the spinal cord and the relatively large width of the pelvis bone at its upper end (iliac crest).

Os pubis has a pattern that is very similar among different individuals.

Acetabulum denotes a specific position at the cup of the hip point. It is located at the upper edge of the hip joint's sphere. Tomography images of this location show a specific cup shape of the bone which is very similar among different individuals.

Trochanter major marks the position of maximum width of the bone tissue in the pelvis region.

The upper and the lower end of the symphysis points can be used as additional reference point.

The cervix middle point refers to a designated position of the cervix that lies approximately in the middle of the jaws and the axilla, i.e. at the lower end of the larynx.

The axilla middle point refers to a designated position of the patient's shoulders given by a relative maximum width of bone tissue.

The thorax superior point refers to the highest position of the thorax, the upper end of the lung tissue.

The thorax middle point refers to the central position of the lung tissue.

The trachea bifurcation point marks the position where the trachea splits up into two parts leading towards the pulmonary lobes.

In some embodiments, the anatomic landmarks in a 3-D image can be detected by pattern matching. Detection of anatomic landmarks by pattern matching generally involves an optional prefiltering, use of a limited search range within the 3D image, a template (or predefined pattern), and a difference function. Finding the landmark this way means to find the best matching position of the template in the 3-D image.

The best matching position is the position of the template where the average absolute difference between intensity values of the template and the image are minimal. Search ranges are often defined in relation to segments detected in presegmentation. Search ranges and templates used in anatomic orientation are mostly 2-dimensional, but may be 3-dimensional as well.

Figure 3:
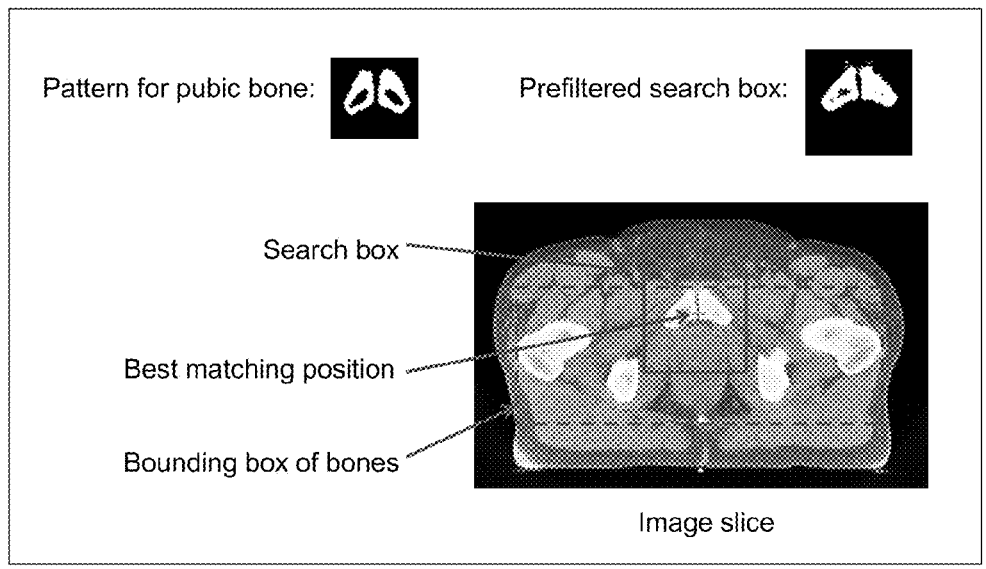
FIG. 3 illustrates exemplary pattern matching for finding pubic bone landmark in accordance with one embodiment of the present invention.

FIG. 3 illustrates the pattern matching elements involved in finding the pubic bone landmarks. The pattern is a predefined image which looks similar to the pubic bone of most individuals when cut in a tomography image at the typical location. The dotted box shows the bounding box of the bone (high density) segments. The solid box shows the search range, which is a box inside the current slice.

The search range is defined by selecting a number of plausible slices. In some embodiments, the plausible slices are selected by using the navigation table as described below. Then, within each slice, the search box is defined relatively to the top edge of the bounding box of the bone segments. This reduces the search range drastically in all 3 dimensions.

Figure 4:
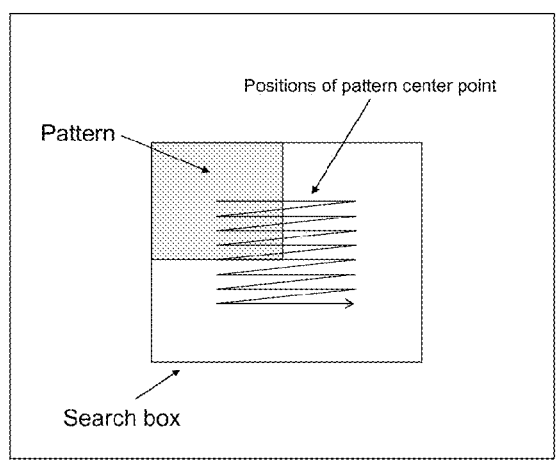
FIG. 4 illustrates exemplary scanning of a search box with pattern in accordance with one embodiment of the present invention.

For each slice being processed, the image data within the search box is filtered with a substitution filter that substitutes bone intensity with white and all other intensities with black, as shown in the upper right image in FIG. 3. The prefiltered box is then compared to the predefined pattern shown in the upper left image in FIG. 3 by moving the pattern over the search box and comparing the pattern to the image data at every position. FIG. 4 illustrates exemplary scanning of the search box with a pattern.

The scanning position with the least difference is recorded. This yields a minimum position and difference value per slice. The lowest value of these differences defines the best matching slice which finally is the landmark position. For anatomic orientation, the slice number is used, and the other two components (lateral and ventral) of the landmarks can be ignored.

In some embodiments, anatomic landmarks are detected by image plane feature classification. Image plane features are properties of the input image slices which can be calculated using the density groups produced in the presegmentation step. Typical image plane features include the width of the bounding box of all body segments, height of the bounding box of all body segments, sum of areas of all high density segments, number of high density segments, and area of the largest low density segment, etc. In some specific locations of the anatomy, such as the shoulder or the iliac crest, these features or functions of these features have very typical values.

Figure 5:
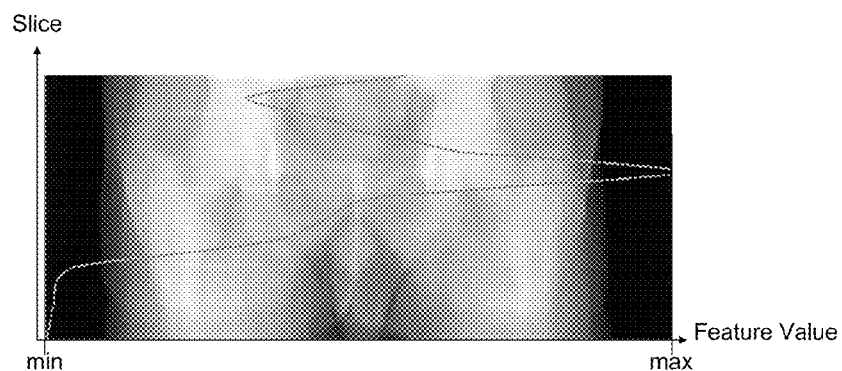
FIG. 5 illustrates exemplary image plane feature in a simulated radiograph for the pelvis region in accordance with one embodiment of the present invention.

FIG. 5 illustrates exemplary image plane features in a simulated radiograph. The value of the feature is plotted from left to right, from its minimum value to its maximum value, on top of a simulated radiograph. The presented image is from the pelvis region, and the feature plotted is the per slice sum of areas of all bone segments or high density segments. The minimum value at the bottom left edge of the plot represents the sum of the two thigh bones' areas, whereas the maximum is found at a slice that cuts through the hip joints and a large amount of pelvic bone material. The feature value is measured in square millimeters. Anatomically, above a certain threshold, there are only two locations in the skeleton that can be cut with such a large bone area, namely the shoulders and the position of the pelvis shown in the plot.

To use this feature for reliable detection of a landmark, the possible confusion of the widest pelvic point with the shoulders can be resolved by use of other features, e.g., by introducing a new feature value which combines values of multiple features. In this case, the proportion of the body outline is a good candidate for a second feature to distinguish between shoulders and pelvis.

Figure 6:
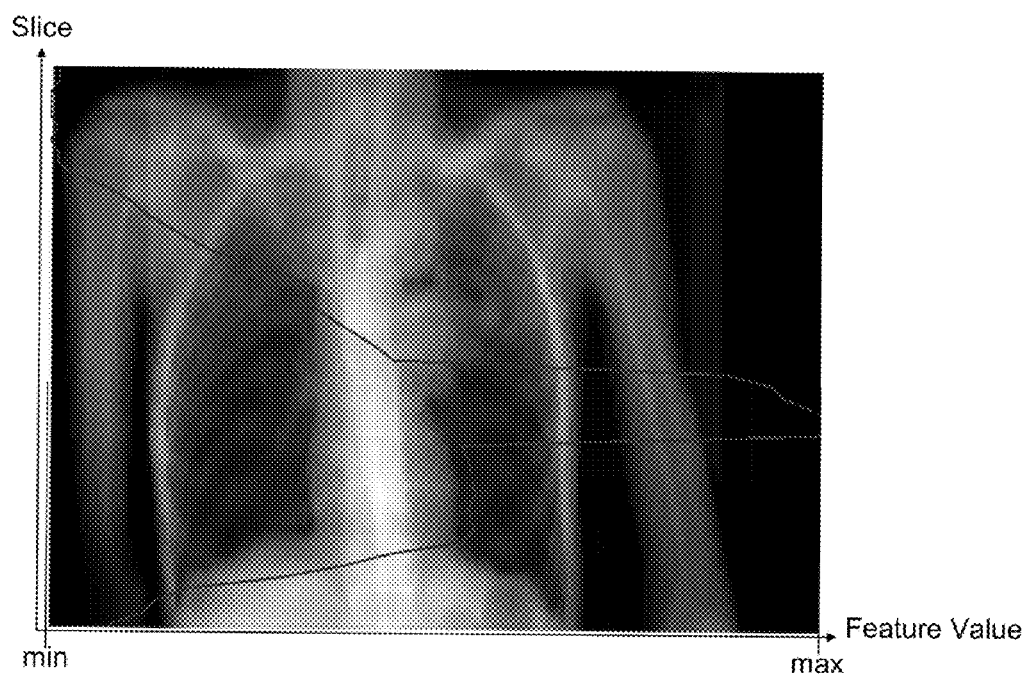
FIG. 6 illustrates an exemplary image plane feature for the thorax region, the total area of lung equivalent tissue, in accordance with one embodiment of the present invention.
Figure 7:
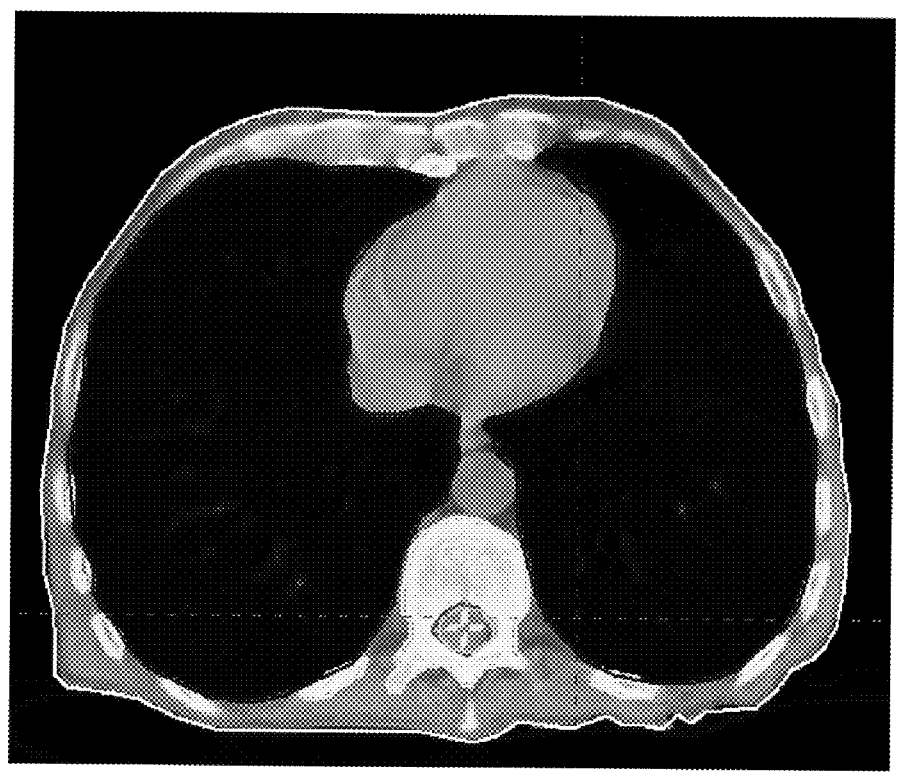
FIG. 7 is an axial image slice showing the plane with the maximum value of the feature in FIG. 6 in accordance with one embodiment of the present invention.

FIG. 6 illustrates another example of image plane feature in a CT image for the thorax region. FIG. 7 is an axial image slice showing the area of the largest low density segment. As there are no lung and/or air segments within the body outline at and near the position of the shoulders, this is where the minimum value is found. The maximum value is found at the slice with the largest lung segment. The value of this feature's maximum represents a well known location of the human thorax. No other area of the body contains single segments of such a large area.

A confidence value can be assigned to each identified landmark. The confidence value can be a value between 0 and 1 and indicates how reliably the landmark has been found.

Confidence values can be used when the navigation table is created and refined. The better the confidence, the more significant a point is for the construction of the navigation table, i.e., the more weight is given in the interpolation step.

The calculation of the confidence value depends on the detection method used to find the respective landmark. For pattern matching method, the confidence value can be calculated by interval.

Pattern matching yields a minimum matching difference value for every pair of image and template as described above. In anatomic orientation, the matching difference between the template image and the image searched at a given position is the average of the absolute pixelwise differences.

For example, a lower and an upper bound of matching difference is determined for each template in use. The confidence of the match is then scaled linearly within these bounds, while 0 is below the lower bound and 1 above the upper bound.

Given the minimum matching difference value V, a lower bound L and an upper bound U of certain match, the confidence value C is thus calculated as $$C = \begin{matrix} 0 & \text{if } V < L \\ 1 & \text{if } V > U \\ (V-L)/(U-L) & \text{if } V \text{ in } [L, U] \end{matrix}$$

In some embodiments, the confidence value is calculated by voting. This method is used whenever the quality of detection is determined by a number of hits supporting it. Then, the confidence is calculated according the following:

Confidence=Number of Hits/Maximum Possible Hits

Returning again to FIG. 1, the process proceeds to construct a navigation table after anatomic landmarks are identified.

Navigation table is a table which describes the relation of the image slices being processed to a reference system of the human anatomy. The reference system can be a scale along the Z axis (cranio-caudal axis) of the human body, extending from the head to the feet. Reference system Z positions can be stored in millimeters.

The navigation table describes a correspondence relation in one dimension and is stored as a one dimensional array as follows:

TABLE 1

Relation between image slice number and reference Z position

| Image Slice Number | Reference Z position |
|---|---|
| 0 | Corresponding reference position |
| 1 | Corresponding reference position |
| ... | |
| N − 1 | Corresponding reference position |

The table has as many rows as there are slices in the image.

Figure 8:
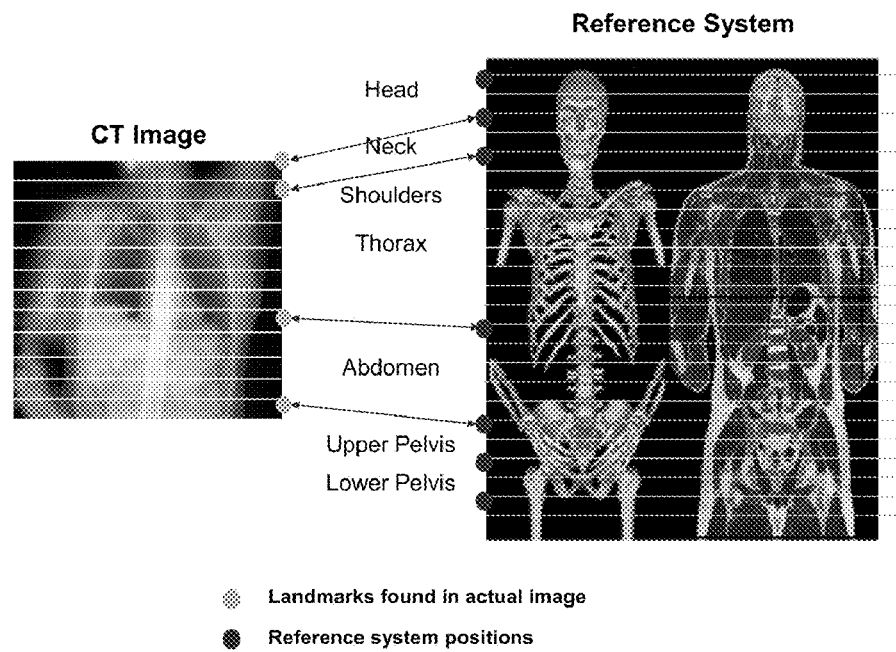
FIG. 8 illustrates exemplary relation between a reference system and CT image slices in accordance with one embodiment of the present invention.

The table is constructed by finding well-defined landmarks, the corresponding positions of which in the reference system are known in the CT image. FIG. 8 illustrates an example with 4 landmarks in the CT image (on the left side) and their correspondences indicated by the arrows to the reference system (on the right side). The reference positions for the remaining image slices, where no landmarks were found, are determined by interpolation, e.g., by an elastic vector field interpolation as will be described below.

Given the list of landmark positions in the CT image and the list of corresponding reference positions, the problem of building the navigation table can be formulated as a 1-dimensional point based non-rigid registration. Since the correspondence between points is well known, the problem degenerates to a vector field interpolation.

Figure 9:
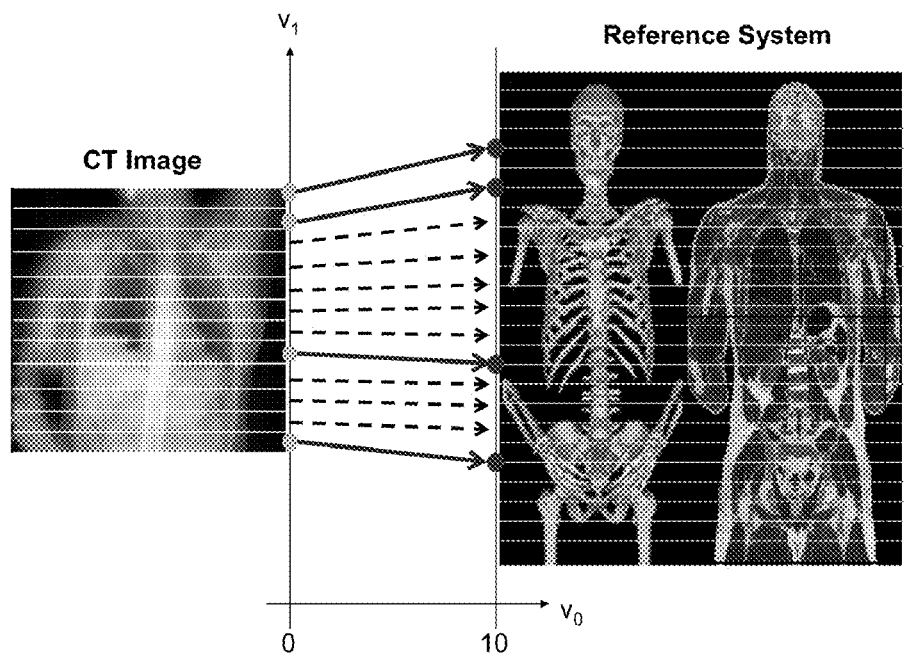
FIG. 9 illustrates exemplary vector field interpolation for building navigation table in accordance with one embodiment of the present invention.

As illustrated in FIG. 9, the solid arrows denote interpolation vectors given by corresponding point or landmark pairs, whereas the dotted arrows show interpolated vectors. To build the navigation table, the v1 component of the interpolated vectors are used. For anatomic orientation, a 2-D vector field interpolation is used as described in the following pseudo code.

Two point sets, a set of source points and a set of destination points define the reference vectors for the vector field at the locations of the source points. The displacement vectors at all positions are calculated by interpolation of the reference vectors, weighted by inverse square distance and an individual weight factor per reference vector.

Let $(u_0, p_0); \ldots ; (u_{K-1}, p_{K-1})$ be the K reference vectors and their positions and $w_0; \ldots ; w_{K-1}$ their weight factors The interpolated vector field v(x,y) is then given by $$\vec{v}(\vec{x}) = \frac{1}{\sum_{k=0}^{K-1} \frac{w_k}{\|\vec{p}_k - \vec{x}\|^2}} \sum_{k=0}^{K-1} \frac{w_k}{\|\vec{p}_k - \vec{x}\|^2} \cdot \vec{u}_k$$

Pseudo code (vector field interpolation):

```
Let N be the number of CT image slices
Define V0, V1 as 2-d arrays size N
FOR EACH landmark
    s = slice number of landmark
    V0[s] = 10
    V1[s] = reference position of landmark – slice number of landmark
END FOR EACH
FOR i=0 TO N-1
    IF no landmark with slice number i
        (V0[i], V1[i]) = distance weighted average of landmark vectors
    ENDIF
    Set navigation table ref. position at slice i to V1[i]
END FOR
```

Figure 10:
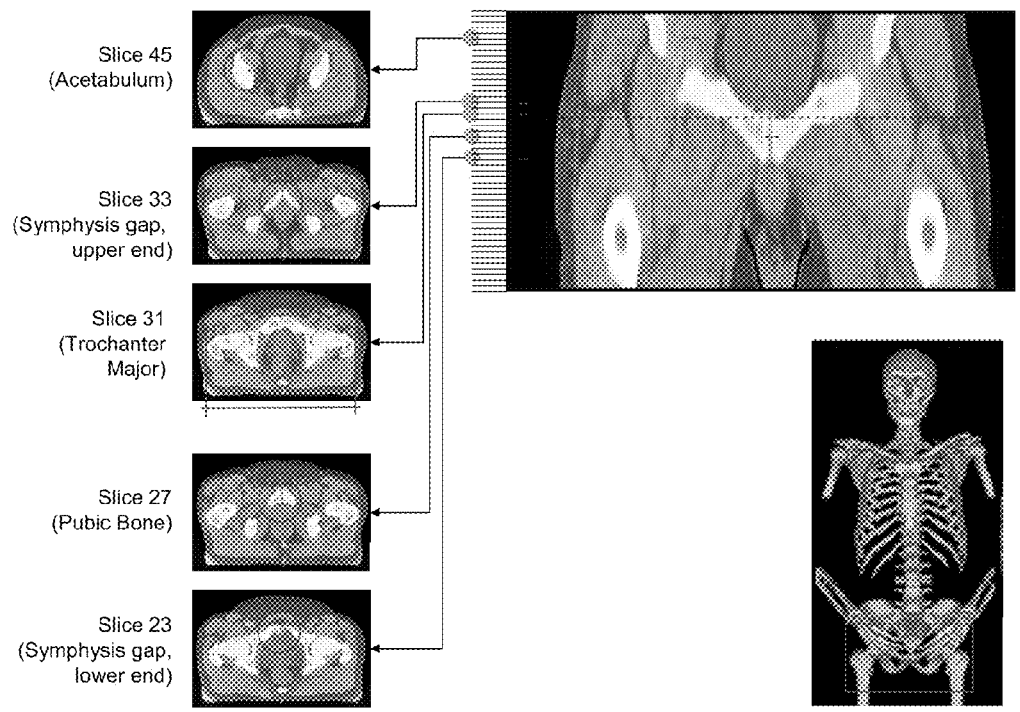
FIG. 10 illustrates exemplary anatomic landmarks in the pelvis region in accordance with one embodiment of the present invention; the left column shows CT axial image slices with landmarks, the upper right image is a coronal slice of the same CT image, and the lower right image shows the region of the human skeleton covered by the CT image.

FIG. 10 shows CT image slices for the pelvis region in the left column. The upper right image in FIG. 10 is a coronal slice of the same CT image. The lower right image in FIG. 10 shows the region (within a bounding box) of the human skeleton covered by the CT image. The CT image has 50 slices. Landmarks are found in slice Nos. 23, 27, 31, 33, and 45. Slice No. 23 shows symphysis gap, lower end. Slice No. 27 shows pubic bone. Slice No. 31 shows trochanter major. Slice No. 33 shows symphysis gap, upper end. Slice No. 45 shows acetabulum.

The corresponding positions of the landmarks in the reference system are predefined as follows:

TABLE 2

Reference positions for landmarks in the pelvis region

| Landmark name | Position from top of head in mm |
| --- | --- |
| Acetabulum | 847 |
| Syphysis gap, upper end | 893 |
| Trochanter Major | 904 |
| Pubic Bone | 914 |
| Syphysis gap, lower end | 927 |

Interpolation leads to the following navigation table (slices with landmarks highlighted):

TABLE 3

Navigation table for the pelvis region

| Slice Number | Reference Position |
| --- | --- |
| 0 | 1023 |
| 1 | 1019 |
| 2 | 1015 |
| 3 | 1011 |
| 4 | 1006 |
| 5 | 1002 |
| 6 | 998 |
| 7 | 991 |
| 8 | 990 |
| 9 | 986 |
| 10 | 982 |
| 11 | 978 |
| 12 | 974 |
| 13 | 970 |
| 14 | 965 |
| 15 | 961 |
| 16 | 957 |
| 17 | 953 |
| 18 | 948 |
| 19 | 944 |
| 20 | 940 |
| 21 | 953 |
| 22 | 931 |
| 23 | 927 |
| 24 | 923 |
| 25 | 920 |
| 26 | 918 |
| 27 | 914 |
| 28 | 911 |
| 29 | 909 |
| 30 | 907 |
| 31 | 904 |
| 32 | 898 |
| 33 | 893 |
| 34 | 889 |
| 35 | 885 |
| 36 | 881 |
| 37 | 877 |
| 38 | 873 |
| 39 | 870 |
| 40 | 866 |
| 41 | 862 |
| 42 | 859 |
| 43 | 855 |
| 44 | 851 |
| 45 | 847 |
| 46 | 843 |
| 47 | 839 |
| 48 | 835 |
| 49 | 831 |

In the above example, the direction of slice numbers is inverse to the direction of the reference system Z coordinate. This indicates a head to feet direction of −1 in the CT image, i.e. that slice numbers decrease from the head to the feet. In other words, the patient orientation can be detected and checked again using the navigation table.

Figure 11:
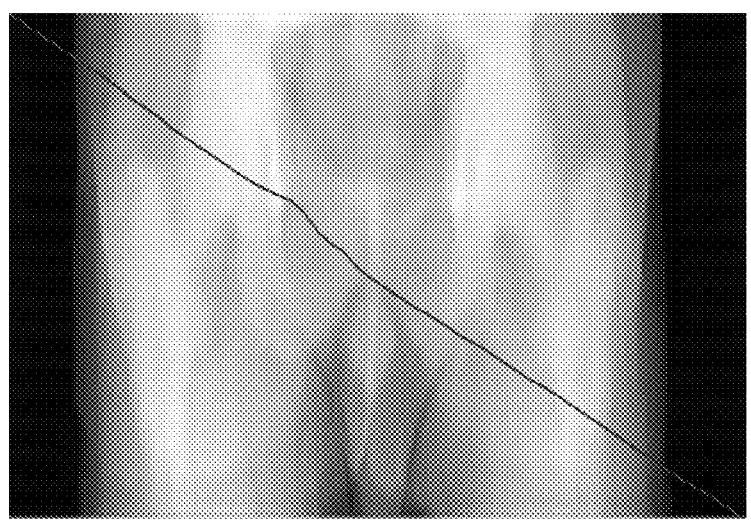
FIG. 11 illustrates an exemplary plot of navigation table superimposed on a simulated radiograph in accordance with one embodiment of the present invention.

The effect of the interpolation can be seen from Table 3 and FIG. 11. In FIG. 11, a plot of the reference position (right column of navigation table) is shown superimposed on a simulated radiograph. Due to variations in landmark positions among human individuals, a transformation between the reference system and actual patient is not linear, otherwise, there would be a straight line in the plot. Table 3 also shows that in the range of slice No. 0 to 3, the reference positions increment by 4 mm per slice, wherein the increment is 2 mm only in the range of slice No. 28 to 30.

Figure 12:
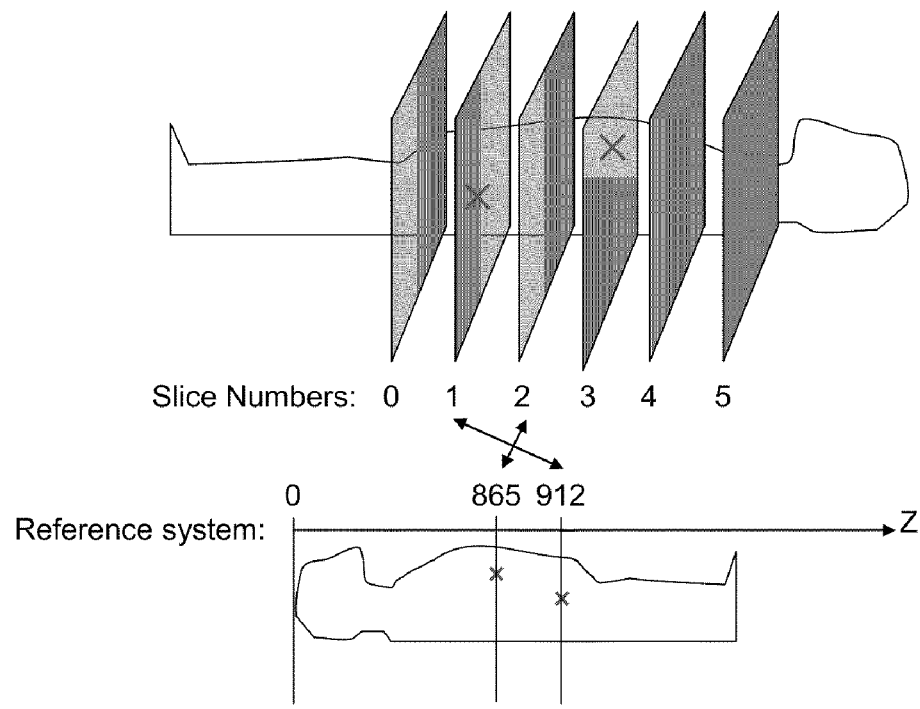
FIG. 12 illustrates detection of a patient's orientation using landmarks in accordance with one embodiment of the present invention.

FIG. 12 shows an example where landmarks and their known reference positions are used for patient orientation detection. In the head-to-feet direction of the CT image, two anatomic landmarks are found in two distinct image slices of the image. Since it is known which of the two is closer to the head by anatomic knowledge, the head-to-feet direction is given by the order of the slice numbers of the two landmarks.

By comparing the order of the two image slices identified with anatomic landmarks with the order of the reference positions in the reference system indicating the known anatomic landmarks, the patient's orientation can be determined.

Figure 13:
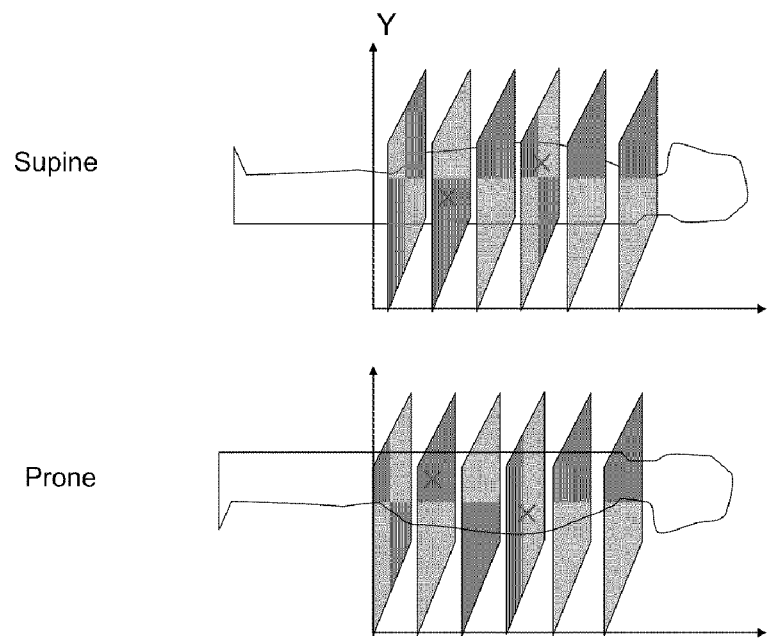
FIG. 13 illustrates detection of a patient's position using landmarks in accordance with one embodiment of the present invention.

FIG. 13 shows an example where landmarks are used in patient's prone/supine position detection. Two anatomic landmarks are identified in the CT image, either in the same or distinct slices. In contrast to the head-to-feet orientation, the prone/supine detection relies on the position on the Y axis (image row) of the landmarks. By comparing the positions for the identified and known landmarks on the Y axis, the patient's position information can be determined.

The anatomic orientation described above can also be used in the body region detection. The image slices can be analyzed to distinguish between thorax slices, pelvis slices, abdominal slices and slices of a currently unknown body region. Each image slice is checked for region specific landmarks.

As described above, the present invention provides a method for anatomic orientation. The anatomic orientation provides a navigation table mapping the input image planes to an anatomic reference system. It also provides information about the input image content such as patient gender, patient orientation, patient position and body region. Therefore, the anatomic orientation described herein is a powerful knowledge acquisition tool for a variety of applications including automatic segmentation, automatic classification, data mining, and retrieval in medical databases. It is also very useful in fast automatic verification of image content for quality and safety assurance, for example, in radiotherapy. The anatomic orientation described herein enables robust and fast automatic segmentation. No user input of prior knowledge is needed in automatic segmentation thanks to the anatomic orientation.

From the foregoing it will be appreciated that, although specific embodiments of the invention have been described herein for purposes of illustration, various modifications may be made without deviating from the spirit and scope of the invention.

What is claimed is:

1. A method of automatic segmentation of an anatomic structure in medical images for a region of interest in a subject, comprising the steps of:
    receiving a set of images representative of the region of interest;
    constructing a navigation table using a processor relating the set of images to a reference system, the reference system including reference positions indicating known anatomic landmarks of a reference subject;
    selecting one or more images including the anatomic structure by looking up the navigation table; and
    performing a segmentation procedure for the selected images.

2. The method of claim 1 further comprising the step of defining a range of images for performing the segmentation procedure by looking up the navigation table.

3. The method of claim 1 wherein the segmentation procedure comprises the step of iterating images in an incremented or a decremented order of the reference positions of the range of the images.

4. The method of claim 1 wherein the medical images are X-ray computed tomography (CT) images.

5. The method of claim 1 wherein the region of interest is the pelvis region of a patient.

6. The method of claim 1 wherein the region of interest is the thorax region of a patient.

7. A computer program product embodied in a computer readable non-transitory medium for automatic segmentation of an anatomic structure in medical images for a region of interest, comprising:
    code for receiving a set of images representative of the region of interest;
    code for constructing a navigation table relating the set of images to a reference system, the reference system including reference positions indicating known anatomic landmarks of a reference subject;
    code for selecting one or more images including the anatomic structure by looking up the navigation table; and
    code for performing a segmentation procedure for the selected images.

* * * * *